(12) United States Patent
Raichelgauz (10) Patent No.: US 12,505,334 B1
(45) Date of Patent: Dec. 23, 2025

(54) SHARED REPRESENTATION OF NEURAL NETWORK RESOURCES

(71) Applicant: AUTOBRAINS TECHNOLOGIES LTD, Tel Aviv-Jaffa (IL)

(72) Inventor: Igal Raichelgauz, Tel Aviv (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 0 days.

(21) Appl. No.: 18/748,220

(22) Filed: Jun. 20, 2024

(51) Int. Cl.
*G06N 3/045* (2023.01)

(52) U.S. Cl.
CPC .................. *G06N 3/045* (2023.01)

(58) Field of Classification Search
CPC ..................................... G06N 3/045
See application file for complete search history.

(56) References Cited

U.S. PATENT DOCUMENTS

| | | | | |
|---|---|---|---|---|
| 5,384,895 A * | 1/1995 | Rogers | ............... | G06F 18/24155 706/31 |
| 11,164,066 B1 * | 11/2021 | Dai | ........................ | G06N 3/044 |
| 11,232,356 B2 * | 1/2022 | Chen | ......................... | G06N 3/04 |
| 11,620,516 B2 * | 4/2023 | Loh | ........................ | G06N 3/045 706/20 |
| 11,853,391 B1 * | 12/2023 | Ladkat | .................. | G06N 3/063 |
| 2019/0286980 A1 * | 9/2019 | Backhus | ................. | G06N 20/10 |
| 2021/0182692 A1 * | 6/2021 | Raichelgauz | ......... | G06V 10/764 |
| 2022/0111862 A1 * | 4/2022 | Raichelgauz | .......... | G06V 10/82 |
| 2022/0187841 A1 * | 6/2022 | Ebrahimi Afrouzi | ........................ | G05D 1/0274 |
| 2022/0318557 A1 * | 10/2022 | Mohseni | ................. | G06V 20/56 |
| 2022/0391674 A1 * | 12/2022 | Caserta | ..................... | G06N 3/08 |
| 2023/0067841 A1 * | 3/2023 | Saharia | .................... | G06N 3/047 |
| 2023/0342589 A1 * | 10/2023 | Laszlo | ..................... | G06F 18/22 |
| 2024/0144729 A1 * | 5/2024 | Septiana | ................. | G06N 3/096 |
| 2025/0200390 A1 * | 6/2025 | Muthiah | ................. | G06N 3/063 |

\* cited by examiner

*Primary Examiner* — Oluwatosin Alabi
(74) *Attorney, Agent, or Firm* — RECHES PATENTS (57) ABSTRACT

A method of producing a group of neural networks, the method includes determining a first layer potion that is shared by a first neural network sub-group of the group; determining second layer portions that are sharable by second neural network sub-groups, such that different second layer portions are shared by different second neural network sub-groups of the group; and determining third layer portions that are sharable by third neural network sub-groups, such that different third layer portions are shared by different third neural network sub-groups of the group; wherein each neural network of the group further comprises a unique combination of layer portions.

17 Claims, 8 Drawing Sheets

SHARED REPRESENTATION OF NEURAL NETWORK RESOURCES

BACKGROUND

Neural networks are employed in vehicles for various purposes including the classification of items sensed by sensors related to the vehicle, and providing responses related to driving based on the classification on items.

Neural networks are expected to provide highly accurate response under varying circumstances—and may be very large-thus consume a lot of resources.

There is a growing need to reduce the resource consumption associated with storing neural networks and performing neural network related processing.

SUMMARY

A method, system and non-transitory computer readable medium as illustrated in the application.

A BRIEF DESCRIPTION OF THE DRAWINGS

The embodiments of the disclosure will be understood and appreciated more fully from the following detailed description, taken in conjunction with the drawings in which.

DETAILED DESCRIPTION

The different figures illustrates examples of units and/or software and/or information items and/or steps and/or components. These examples are provided for brevity of explanation.

At least one of the units and/or software and/or information items and/or steps and/or components is optional or mandatory.

According to an embodiment there is provided a group of neural networks, the group includes shared layer portions that are shared between different neural networks of the group. The usage of shared layer portions may dramatically reduce the memory consumption (for example by at least a factor of 1.1, 1.2, 1.5, 2, 2.5, 3, 3.5, 4, 4.5, 5, 10, 20, 50, 100, 200 and even more).

According to an embodiment, the group of neural networks is determined based on one or more input constraints such as one or more size parameters such as overall size, memory space required to store the group of neural networks, number of layers of the group of neural networks, number of layer portions per layer of the group of neural networks, size (bits allocated to) weights and/or biases and/or activation value.

According to an embodiment, the group of neural networks exhibits one or more additional input constraints such as type of numbers (fixed point representation or floating point representation), and/or type of activation function, and the like.

According to an embodiment, one or more size parameters regarding the group of neural networks is determined based on at least one rule, at least one model, at least one constraint, at least one optimization parameter, a computation consumption associated with implementing the group of neural networks, a memory consumption associated with implementing the group of neural networks, a tradeoff between the one or more size parameters regarding the group of neural networks and one or more performance parameter of the group of neural networks (for example accuracy, latency, false positive rate, false negative rate, true positive rate, true negative rate, and the like).

According to an embodiment, an outcome of a tradeoff is determined by applying a function on two or more factors or parameters or values and determined. The function may be linear, non-linear, exponential, logarithmic, a weighted sum, and the like.

According to an embodiment the group of neural networks may grow in a logarithmic manner-instead of growing in an exponential or multiplicative manner (when separately trained neural networks are used instead of the group of neural networks).

According to an embodiment, a vehicle stores one or more groups of neural networks and can be provided (for example by vehicle to vehicle communication or vehicle to other entity communication) one or more other groups of neural networks. The provision of a group of neural networks may be done dynamically so that the vehicle stored different groups of neural networks at different points in time.

According to an embodiment, the dynamic provision is dependent on one or more parameters such as the path to be passed by the vehicle (different paths may be better services by different groups of neural networks), the driver that drives the vehicle (autonomous or person, one specific driver or another specific driver), and/or any other scene parameter and/or contextual parameter and/or environmental parameter and/or safety parameter and/or comfort parameter that may impact the relevancy (or fit) of one or more groups of neural networks to be sent to the vehicle, and the like.

Additionally or alternatively, the dynamic provision is based on static and/or dynamic constraints related to the vehicle-such as current availability of memory resources and/or current availability of processing resources and/or current availability of communication resources (in-vehicle communication resources and/or out of vehicle communication resources) and/or maximal capacity of memory resources and/or maximal capacity of processing resources and/or maximal capacity of communication resources (in-vehicle communication resources and/or out of vehicle communication resources).

Additionally or alternatively, the dynamic provision is based on latency constraints. The latency constraints may be set by the driver, a vehicle vendor or another entity. According to an embodiment, the latency constraints may impose a reduction of the latency of group of neural networks processing when facing certain scenes and/or certain environmental conditions and/or when a complexity of the environment and/or a danger level associated with driving increases above a threshold. For example—the latency should be lower when driving at a riskier environment and/or under lower visibility conditions and/or when the driver is an unexperienced or accident prone human driver.

According to an embodiment, the group of neural networks exhibits full connectivity.

According to an embodiment, the group of neural networks exhibits only partial connectivity.

According to an embodiment, some of the layer of the group of neural networks are fully connected while some other layers of the group of neural networks are only partially connected.

According to an embodiment, the group of neural networks has a tree like structure.

According to an embodiment, leaf layer portions of the group of neural networks are unique in the sense that a leaf layer portion is included in a single neural network of the group of neural networks.

According to an embodiment, all neural networks of the group of neural networks have the same number of layers.

According to an embodiment, one or more neural networks of the group of neural networks are longer than one or more other neural networks of the group of neural networks.

According to an embodiment, different neural networks of the group of neural networks include different combinations of layer portions.

According to an embodiment, each neural network of the group of neural networks has a unique layer portion that is not included in any other neural network of the group of neural networks.

According to an embodiment, the group of neural networks includes four or more layers, wherein at least a sub-group of neural networks of the group of neural networks include different combinations of portions of the first three layers of the group of neural networks.

According to an embodiment the group of neural networks includes at least 5, 10, 50, 100, 150, 200, 250, 300, 350, 400, 450, 500, 550, 600, 650, 700, 750, 800, 850, 900, 950, 1000, 1100, 1200, 1300, 1400, 1500, 2000, 2500, 3000, 3500, 4000, 4500, 5000, 5500, 10000, 11000, 12000, 15000, 20000, 30000, 40000, 50000, 60000, 100000, 150000, 200000, 250000 and more neural networks.

According to an embodiment there is provided a group of neural networks that includes:
  A. A first layer portion that is shared by a first neural network sub-group of the group. According to an embodiment, there may be multiple first layer portions.
  B. Second layer portions that are sharable by second neural network sub-groups, such that different second layer portions are shared by different second neural network sub-groups of the group.
  C. One or more additional layer portions that are sharable by one or more additional neural network sub-groups, such that different one or more additional layer portions are shared by different one or more additional neural network sub-groups of the group. The one or more additional layer portions include.

According to an embodiment, the group of neural networks include more than three layers—for example may include more than 4, 10, 15, 20, 25, 30, 40, 50, 60, 70, 100, 120, 150, 200, 250, 300, 400, 500, 1000, 1500, 2000 layers and even more.

According to an embodiment, each neural network of the group includes a unique combination of layer portions.

According to an embodiment, each neural network of the group includes at least one dedicated layer portion that is not shared by another neural network of the group.

According to an embodiment, the neural networks are trained across different narrow driving-related tasks.

According to an embodiment, the first layer portion is shared by all the neural networks of the group.

According to an embodiment, at least one layer portion of the neural networks of the group is generated by clustering layers of separately trained neural networks.

According to various embodiments the clustering may include applying any clustering algorithm, such as at least one out of:
  A. K-Means Clustering: Partitions the data into K clusters by minimizing the variance within each cluster.
  B. Hierarchical Clustering: Builds a tree-like structure of clusters by either merging or splitting them successively.
  C. Agglomerative Hierarchical Clustering: Begins with individual points and merges them to form clusters.
  D. Divisive Hierarchical Clustering: Starts with the whole dataset and divides it into clusters.
  E. DBSCAN (Density-Based Spatial Clustering of Applications with Noise): Groups together points that are closely packed and marks points in low-density regions as outliers.
  F. OPTICS (Ordering Points To Identify the Clustering Structure): An extension of DBSCAN that handles varied densities more effectively.
  G. Mean Shift Clustering: Identifies clusters by locating the modes in the density of data points.
  H. Gaussian Mixture Models (GMM): Assumes data is generated from a mixture of several Gaussian distributions and assigns probabilities to each point belonging to a cluster.
  I. Spectral Clustering: Uses eigenvalues of a similarity matrix to reduce dimensionality before clustering in fewer dimensions.
  J. Affinity Propagation: Sends messages between points to identify exemplars and clusters based on these exemplars.
  K. Birch (Balanced Iterative Reducing and Clustering using Hierarchies): Performs hierarchical clustering on large datasets using a combination of other clustering methods.
  L. Agglomerative Clustering: Merges clusters based on the shortest distance between them, creating a hierarchy of clusters.
  M. Self-Organizing Maps (SOM): A type of artificial neural network that is trained using unsupervised learning to produce a low-dimensional representation of the data.
  N. Fuzzy C-Means (FCM): Allows each data point to belong to multiple clusters with varying degrees of membership.
  O. HDBSCAN (Hierarchical Density-Based Spatial Clustering of Applications with Noise): An extension of DBSCAN that finds clusters of varying densities.

According to an embodiment, the clustering may be executed while constraining the number of clusters—or without constraining the number of clusters. It has been found the constraints may improve the accuracy and/or time of execution of the clustering.

According to an embodiment, at least a portion of the neural networks of the group is generated during a mutual training of neural networks.

According to an embodiment, one of neural network of the group was added to the group following a formation of a sub-group of neural networks that included a part of the neural networks of the group.

According to an embodiment the group of neural networks is generated in one or more manners.

According to an embodiment the group of neural networks is modified (for example by adding a new neural network—or by performing any other modification) in at least one manner.

According to an embodiment, manners for generating and/or amending the group of neural network:
A. Include training.
B. Include retraining.
C. Not include re-training.
D. Not include training.
E. Are preceded by training on other neural networks (not included in the group of neural networks).
F. Include training of the other neural networks.
G. Include multiple training iterations.
H. Include training and merging iterations.
I. Include using one or more cost functions.
J. Include multiple iterations wherein during one iterations one or more layer portions are changed while maintaining other layer portions unchanged.

According to an embodiment, there is provided a method of producing a group of neural networks, the method includes: determining a first layer potion that is shared by a first neural network sub-group of the group; determining second layer portions that are sharable by second neural network sub-groups, such that different second layer portions are shared by different second neural network sub-groups of the group; and determining third layer portions that are sharable by third neural network sub-groups, such that different third layer portions are shared by different third neural network sub-groups of the group; wherein each neural network of the group further comprises a unique combination of layer portions.

According to an embodiment, the method includes determining a connectivity between consecutive layer portions, such that determining a layer portion that is sharable by a neural network sub-group is based on the determined connectivity.

According to an embodiment, the determined connectivity is based on a partial connectivity between a layer portion of a specified neural network layer and layer portions of another neural network layer.

According to an embodiment, the method includes determining a number of layer portions per each layer based on an input constraint.

According to an embodiment, the unique combination of layer portions for each neural network defines a narrow driving-related task.

According to an embodiment, a series of layers from the first layer to the dedicated layer forms a neural network associated with a driving related task.

According to an embodiment, the method includes adding a new neural network to the group.

According to an embodiment, the adding is based on a weight fit between weights of layers of the new neural network and weights of layer portions of the group of neural networks.

According to an embodiment, the adding involves retraining the new neural network according to the group of neural networks.

According to an embodiment, the determining of layer portions of the group of NNs is based on separately trained initial NNs.

According to an embodiment, the determining includes clustering layers of the separately trained initial NNs, and determining a shared layer portion by merging layers of a cluster corresponding to the shared layer portion.

According to an embodiment, the determining of layer portions of the group of NNs is based on an outcome of multiple training and merging iterations.

According to an embodiment, the group of neural networks includes neural networks that differ from end-to-end neural networks.

According to an embodiment, the group of neural networks includes end-to-end neural networks.

An example of an end-to-end neural network is a neural network that received an input such as sensed information (or even pre-processed sensed information) and outputs a driving related decision (such as an instruction to perform a driving related operation or a suggestion to perform a driving related decision). The driving related decision may be an autonomous driving decision or an advance driver assistance system decision, or any decision that may result in setting or changing the propagation of the vehicle.

The neural networks of the group of neural networks may be narrow artificial intelligence agents. Narrow may mean that the narrow artificial intelligence agents is responsible to manage only a small faction (for example less than one percent) of the possible scenes faced by the vehicle.

Figure 1:
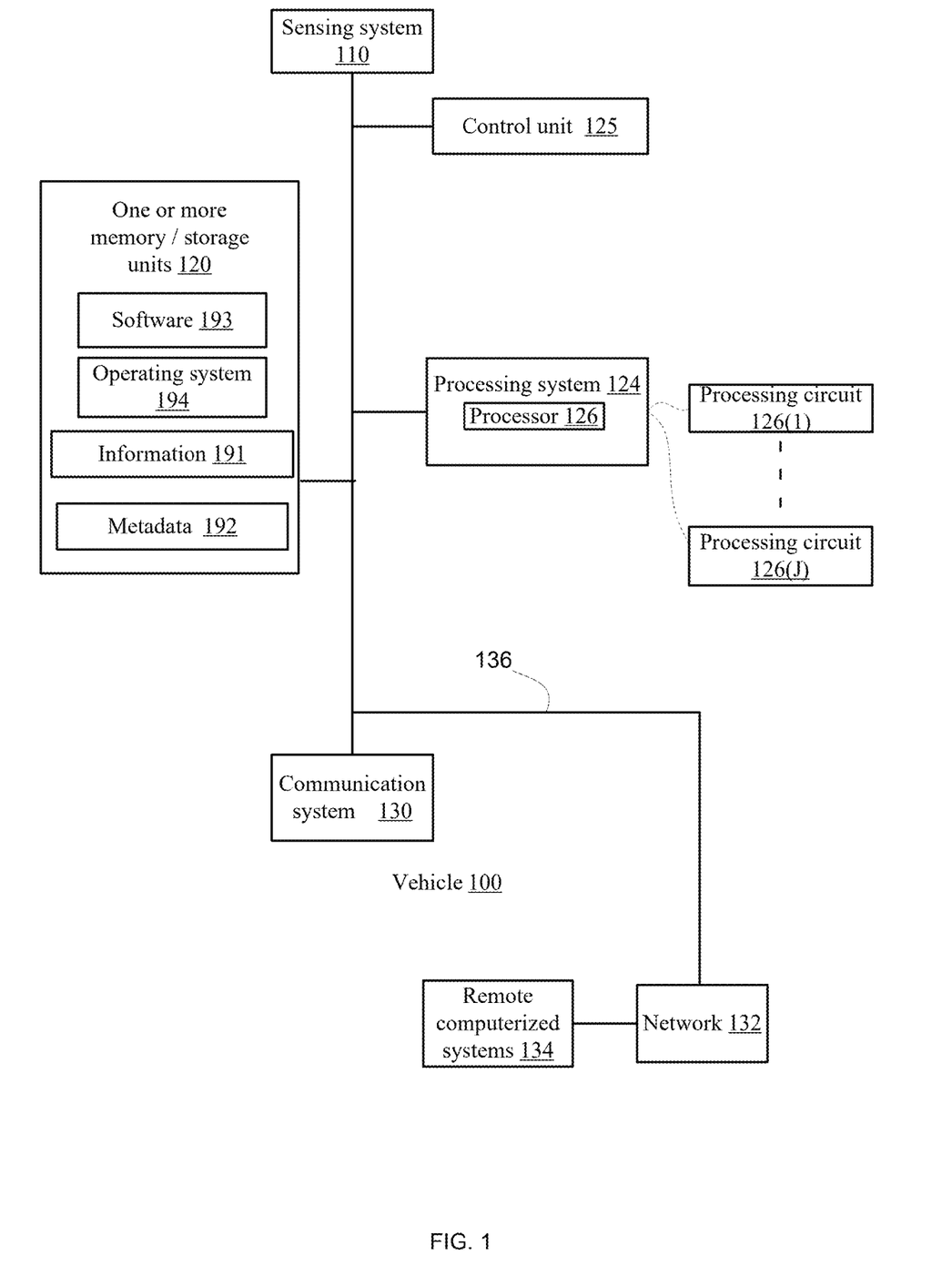
FIG. 1 illustrates an example of a system.
Figure 2:
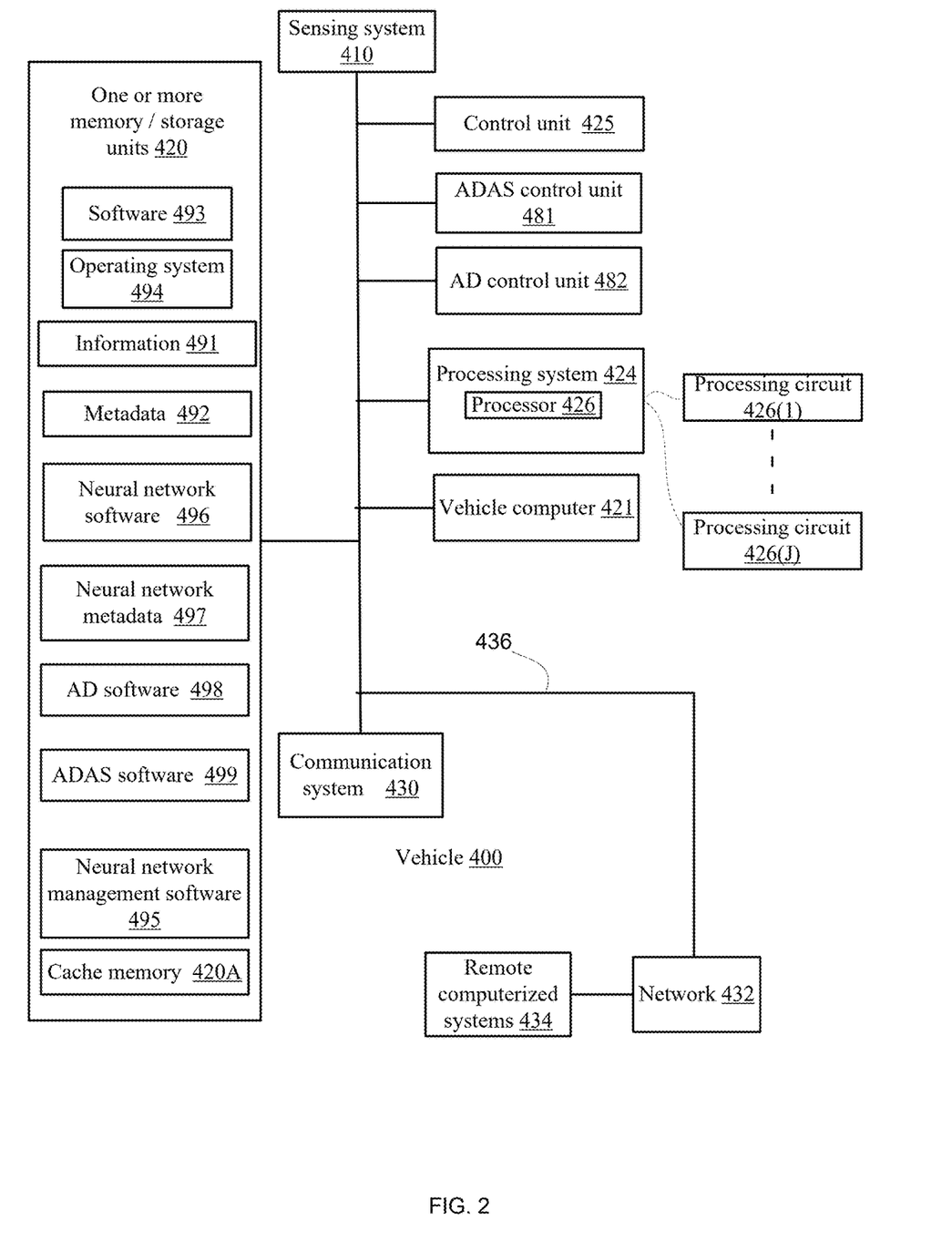
FIG. 2 illustrates an example of a system.

In the following text reference numbers related to FIG. 1 are shown without parenthesis while reference numbers related to FIG. 2 are shown within a parenthesis-whereas any item associated with a reference number without a parenthesis may differ from or equal to the corresponding item within a parenthesis.

FIGS. 1 and 2 illustrate examples of vehicles 100 and 400 that include communication system 130 (430), one or more memory and/or storage units 120 (420), processing system 124 (424) including processor 126 (426). The communication system 130 (430), the one or more memory and/or storage units 120 (420), and the processing system 124 may belong to a computerized system. The computerized system may be a server, a laptop, a desktop or any other computer and may include or be in communication with a sensing unit and/or a controller.

According to an embodiment, vehicle 100 (400) is in communication with network 132 (432) and one or more other remote computerized systems 134 (434) that are in communication with network 132 (432). An example of a remote computerized system is a server or one or more computers having access to a storage system that stores items related to one or more portions of one or more groups of neural networks—at least some of which are not currently stored in the vehicle.

According to an embodiment, the communication system 130 (430) is configured to enable communication between the one or more memory and/or storage units 120 (420) and/or the sensing system 110 (410) and/or any one of the additional units and/or the network 132 (432) (that is in communication with the remote computerized systems).

The memory and/or storage units 120 (420) was shown as storing software. Any reference to software should be applied mutatis mutandis to code and/or firmware and/or instructions and/or commands, and the like.

Processor 126 (426) includes a plurality of processing units 126(1)-126(J) [426(1)-426(J)], J is an integer that exceeds one. Any reference to one unit or item should be applied mutatis mutandis to multiple units or items. For example—any reference to processor should be applied mutatis mutandis to multiple processors, any reference to communication system 130 (430) should be applied mutatis mutandis to multiple communication systems.

According to an embodiment, the one or more memory and/or storage units 120 (420) includes one or more memory unit, each memory unit may include one or more memory banks.

According to an embodiment, the one or more memory and/or storage units 120 (420) includes a volatile memory and/or a non-volatile memory. The one or more memory and/or storage units 120 (420) may be a random-access memory (RAM) and/or a read only memory (ROM).

According to an embodiment, the non-volatile memory unit is a mass storage device, which can provide non-volatile storage of computer code, computer readable instructions, data structures, program modules, and other data for the processor or any other unit of vehicle. For example, and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any content may be stored in any part or any type of the memory and/or storage units.

According to an embodiment, the at least one memory unit stores at least one database-such as any database known in the art-such as DB2®, Microsoft® Access, Microsoft® SQL Server, Oracle®, mySQL, PostgreSQL, and the like.

The memory and/or storage units 120 (420) are configured to store firmware and/or software, one or more operating systems, data and metadata required to the execution of any of the methods mentioned in this application.

The memory and/or storage units 120 (420) was shown as storing software. Any reference to software should be applied mutatis mutandis to code and/or firmware and/or instructions and/or commands, and the like.

Various units and/or components are in communication with each other using any communication elements and/or protocols. An example of a communication system is denoted 130 (430). Other communication elements may be provided.

The communication system 130 (430) may be in communication with bus 136 (436). The bus represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus, and all buses specified in this description can also be implemented over a wired or wireless network connection and each of the subsystems.

Network 132 (432) that is located outside the vehicle and is used for communication between the vehicle and at least one remote computing system. By way of example, a remote computing system can be a personal computer, a laptop computer, portable computer, a server, a router, a network computer, a peer device or other common network node, and so on. Logical connections between the processor and either one of remote computing systems can be made via a local area network (LAN) and a general wide area network (WAN). Such network connections can be through a network adapter (may belong to communication system 130 (430)) which can be implemented in both wired and wireless environments. Such networking environments are conventional and commonplace in offices, enterprise-wide computer networks, intranets, and a larger network such as the internet.

It should be noted that at least a part of the content illustrated as being stored in one or more memory/storage units 120 (420) may be stored outside the vehicle. It should also be noted that the processor may evaluate signatures generated by a plurality of detectors.

Examples of generating signatures and/or cropping images are provided in U.S. patent application Ser. No. 18/527,701 which is incorporated herein by reference.

According to an embodiment, the memory and/or storage units 120 (420) stores at least one of: operating system 194(494), information 191 (491), metadata 192 (492), and software 193 (493).

Figure 7:
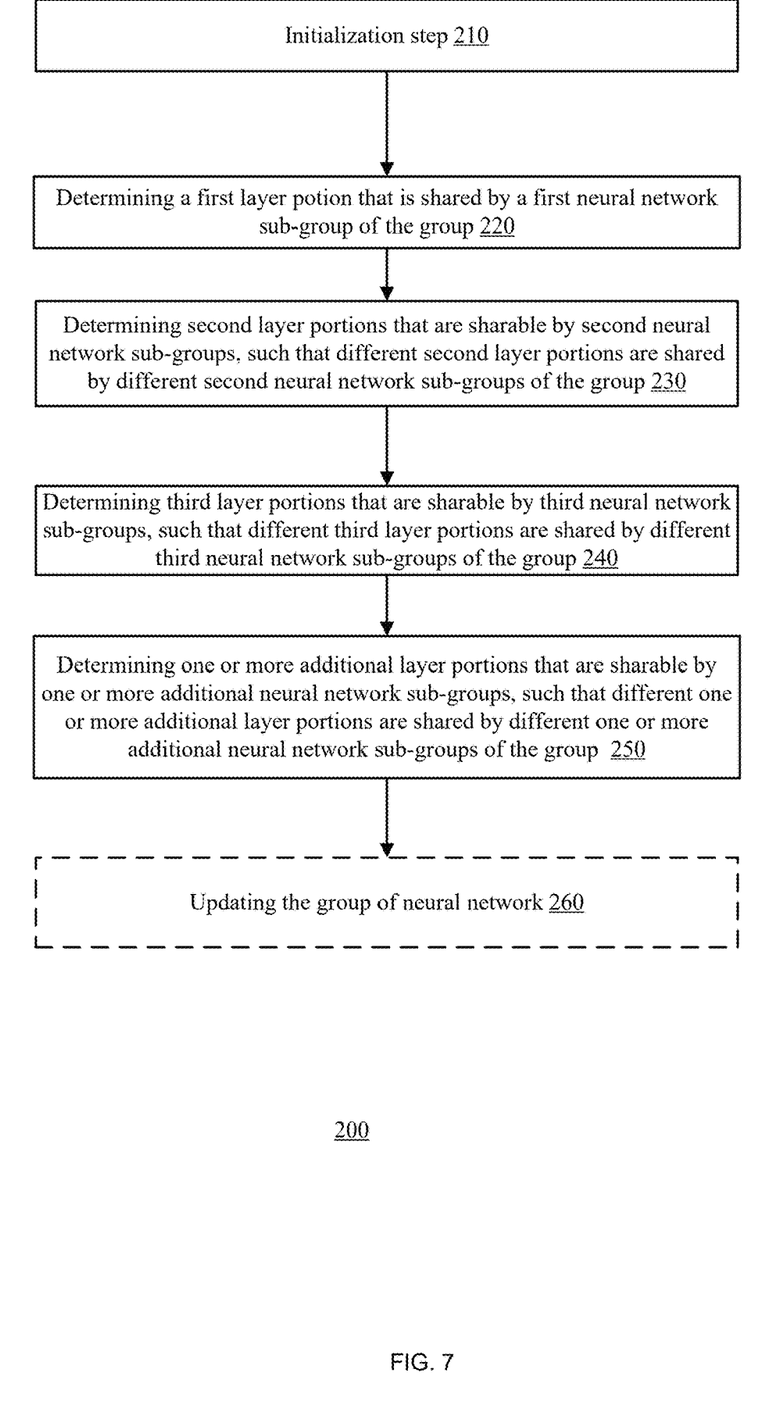
FIG. 7 illustrates an example of a method.
Figure 8:
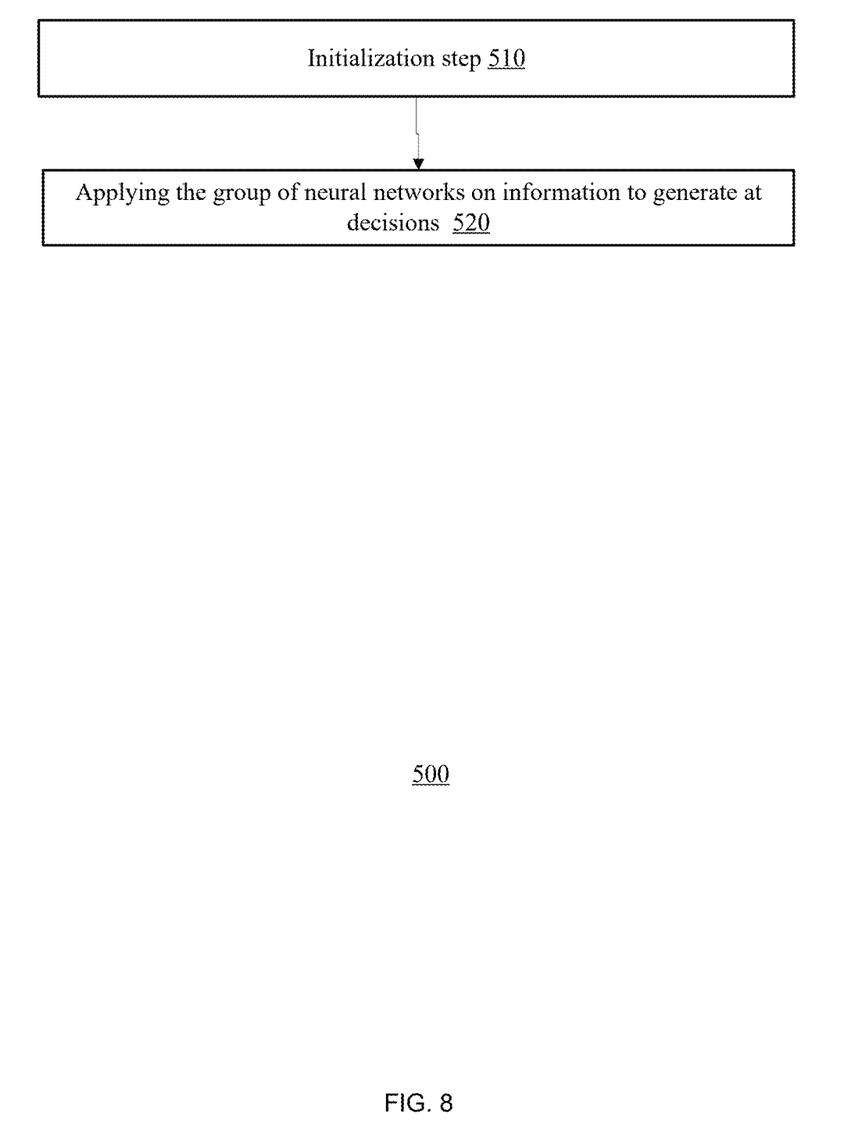
FIG. 8 illustrates an example of a method.

Using the software, the processing system is configured to execute one or more methods of method 200 and 500.

Vehicle 100 (400) also includes sensing system 110 (410) and control unit 125 (425).

The control unit 125 (425) may cooperate with an advanced driver assistance system (ADAS) control unit such as ADAS control unit 481 of FIG. 2, an autonomous driving control unit 482 such as autonomous driving (AD) control unit 482 of FIG. 2 and/or may control or communicate with other vehicle components-including a vehicle computer such as vehicle computer 421 of FIG. 2.

The ADAS control unit 481 is configured to control ADAS operations.

The AD control unit 82 is configured to control autonomous driving of the autonomous vehicle.

The vehicle computer 421 is configured to control the operation of the vehicle-especially controlling the engine, the transmission, and any other vehicle system or component.

The vehicle computer 421 may be in communication with an engine control module, a transmission control module, a powertrain control module, and the like.

The sensing system 110 (410) may include optics, a sensing element group, a readout circuit, and an image signal processor. Optics are followed by a sensing element group such as line of sensing elements or an array of sensing elements that form the sensing element group. The sensing element group is followed by a readout circuit that reads detection signals generated by the sensing element group. An image signal processor is configured to perform an initial processing of the detection signals—for example by improving the quality of the detection information, performing noise reduction, and the like. The sensing system 110 (410) is configured to output one or more sensed information units (SIUs).

The control unit 125 (425) is configured to control the operation of the sensing system 110 (410), and/or the one or more memory and/or storage units 120 (420) and/or the one or more additional units (except the controller).

According to an embodiment, the one or more memory and/or storage units 120 (420) includes one or more memory unit, each memory unit may include one or more memory banks.

According to an embodiment, the one or more memory and/or storage units 120 (420) includes a volatile memory and/or a non-volatile memory. The one or more memory and/or storage units 120 (420) may be a random-access memory (RAM) and/or a read only memory (ROM).

According to an embodiment, the non-volatile memory unit is a mass storage device, which can provide non-volatile storage of computer code, computer readable instructions, data structures, program modules, and other data for the processor or any other unit of vehicle. For example, and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by a computer.

Any content may be stored in any part or any type of the memory and/or storage units.

According to an embodiment, the at least one memory unit stores at least one database-such as any database known in the art-such as DB2®, Microsoft® Access, Microsoft® SQL Server, Oracle®, mySQL, PostgreSQL, and the like.

Various units and/or components are in communication with each other using any communication elements and/or protocols. An example of a communication system is denoted 430. Other communication elements may be provided.

FIG. 2 illustrates the one or more memory and/or storage units as including a cache memory 420A that can be used for storing the most relevant information and/or instructions and/or metadata-such as one or more shared layer portions (especially the weights and/or bias and/or connectivity of the shared layer portion.

FIG. 2 also illustrates one or more items that can be stored (one, some or all of items) in the one or more memory and/or storage units, the one or more items include:
A. Neural network software 496 that once executed by a processor results in neural network processing. The neural network processing may apply the group of neural networks on information.
B. Neural network metadata 497 that stores weights and/or bias and/or connectivity of the group of neural networks—or at least a part of the group of neural networks.
C. AD software 498 configured to control AD operations (for example by instructing the AD control unit 482 to execute instructions), to suggest AD operations to the AD control unit 482, or to implement at least some of the functionality of AD control unit 482.
D. AD software 499 configured to control AD operations (for example by instructing the AD control unit 491 to execute instructions), to suggest AD operations to the AD control unit 491, or to implement at least some of the functionality of AD control unit 491.
E. Neural network management software 495 configured to manage the storage of layer portions of the group of neural networks in the one or, ore memory/storage units

420—for example which portions are stored in the cache or otherwise accessible to the processor 426.

Figure 3:
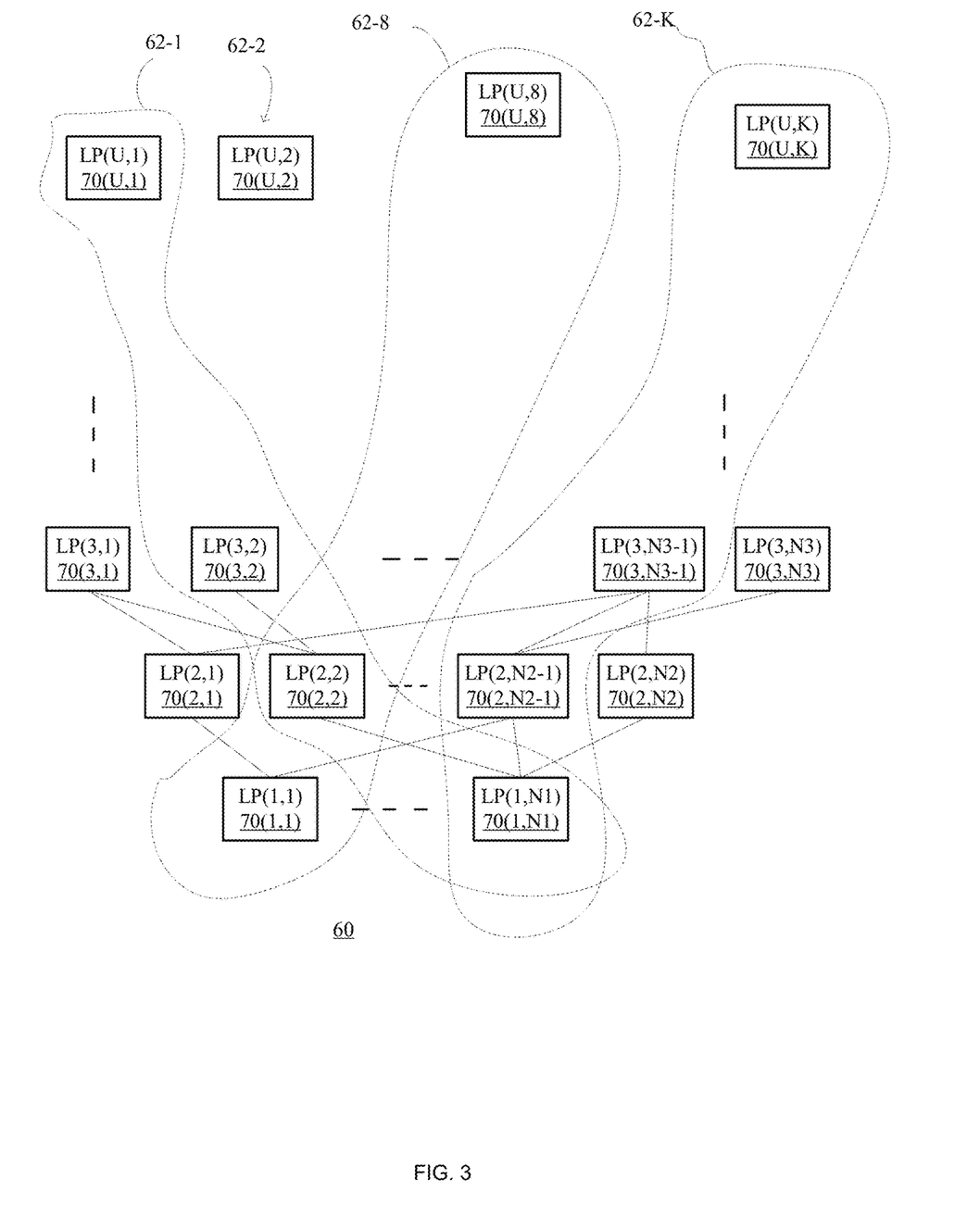
FIG. 3 illustrates an example of a group of neural networks.

FIG. 3 illustrates an example of a group of neural networks 60 that includes K neural networks 62-1 till 62-K, K being an integer that exceeds 4.

The first layer includes a first number N1 of first layer portions LP(1,1)-LP(1,N1) 70 (1,1)-70 (1,N1), a second number N2 of second layer portions LP(2,1)-LP(2,N2) 70 (2,1)-70 (2,N2), a third number N3 of third layer portions LP(3,1)-LP(3,N3) 70 (3,1)-70 (3,N3), and one or more additional layers, whereas each neural network includes a unique combination of layer portions, and each neural network includes a unique layer portion such as LP(U,1)-LP(U,K) 70 (U,1)-70 (U,K), whereas U stand for unique. Unique portions of different neural networks may belong to the same layer of the group of neural networks or may belong to different layers of the group of neural network.

Figure 4:
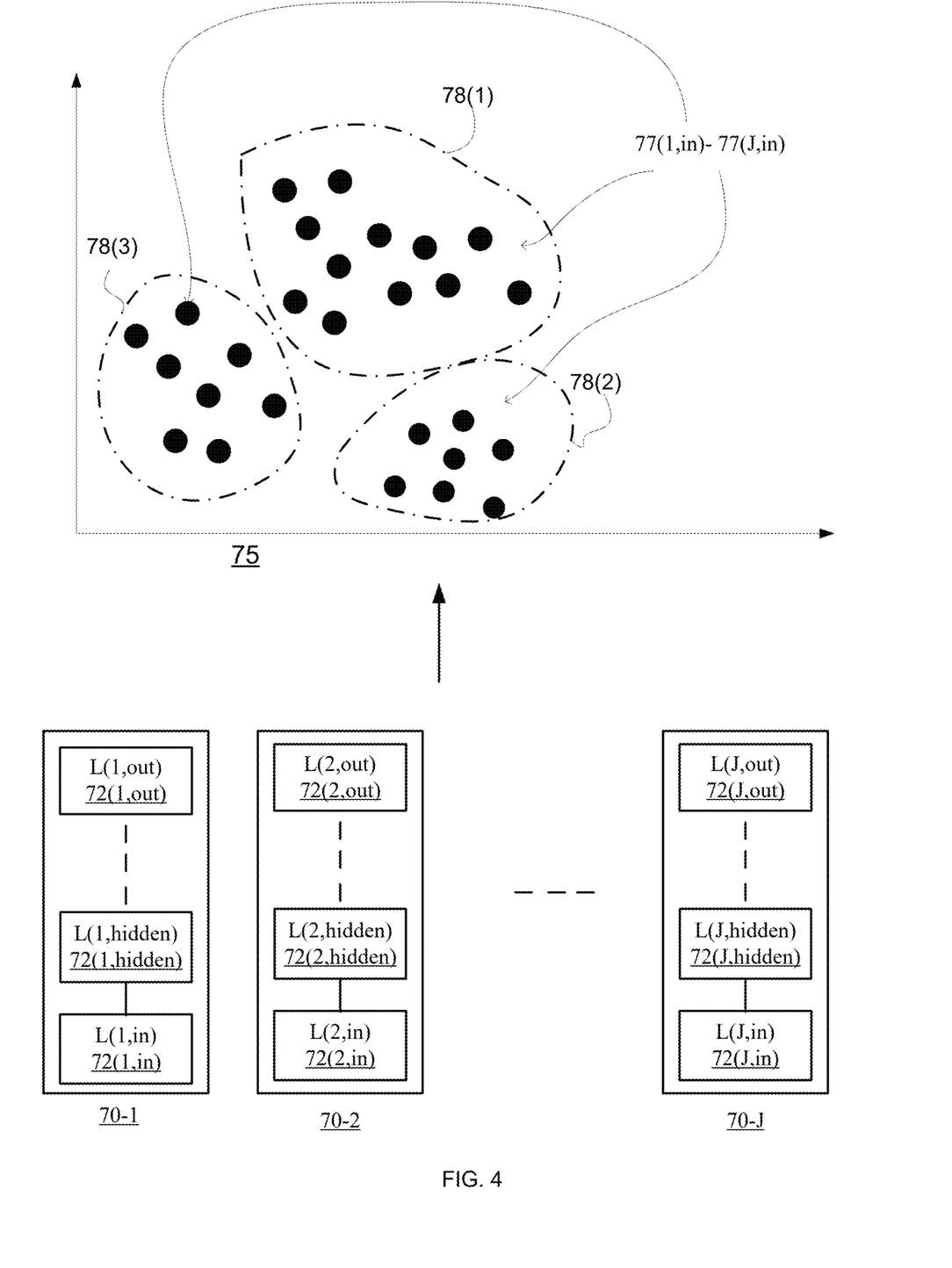
FIG. 4 illustrates an example of a stage of a generation process of the group of neural networks.
Figure 5:
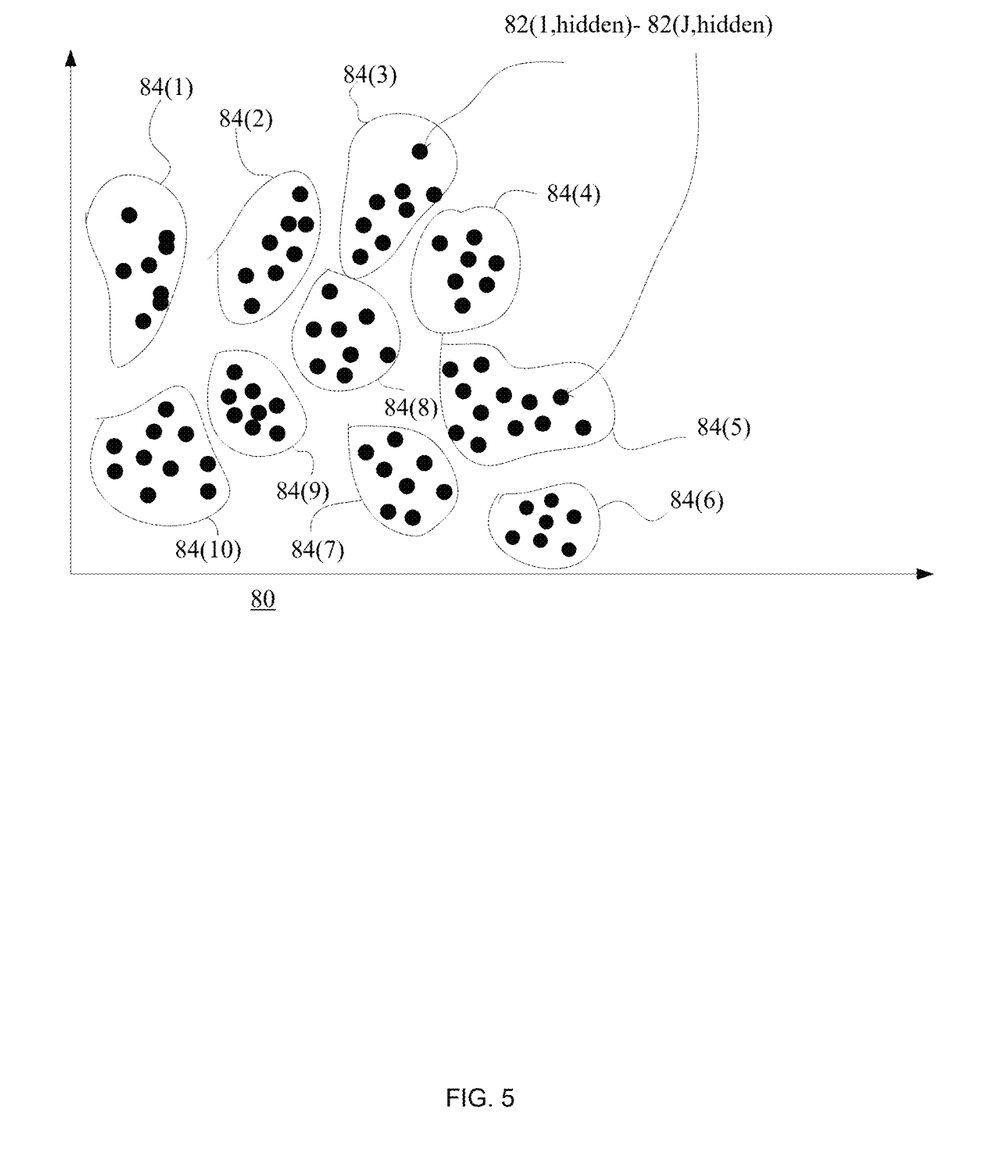
FIG. 5 illustrates an example of another stage of a generation process of the group of neural networks.

FIGS. 4-5 illustrate examples of stages of one or more generation process of the group of neural networks.

According to an embodiment, the one or more generation processes includes generating at least one layer portion of the neural networks of the group by clustering layers of separately trained neural networks and generating layer portions based on the clusters—for example one layer portion per cluster.

According to an embodiment, the one or more generation processes includes generating at least one layer portion of the neural networks during a mutual training of neural networks.

FIG. 4 illustrates a plurality(J) of separately trained neural networks 70-1 till 70-J. These neural networks may also be referred to initial neural networks as they are processed to generate the group of neural network, whereas the neural networks of the group of neural network differ from the initial neural networks.

Each of the separately trained neural networks includes an input layer {L(1,in)-L(J,in) 72 (1,in)-72 (J,in)}, one or more hidden layers {such as {L(1,hidden)-L(J,hidden) 72 (1,hidden) 72 (J,hidden)} and an output layer {L(1,out)-L(J,out) 72 (1,out)-72 (J,iut)}.

First cluster map 75 that includes representations 77 (1,in)-77 (J,in) of the input layers L(1,in)-L(J,in) of the J separately trained neural networks, the representations are clustered to provide N1 clusters—and in FIG. 3-N1 equals three—as shown by three clusters 78(1), 78(2) and 73(3).

The representations may be vectors, embeddings, signatures of the embeddings, and the like. An example of embeddings is illustrated in U.S. patent application Ser. No. 18/527,701 which is incorporated herein by reference.

FIG. 5 illustrates a second cluster map 80 that includes representations 82 (1,hidden)-82 (J,hidden) of the first hidden layer of the J separately trained neural networks, the representations are clustered to provide N2 clusters—and in FIG. 4 N2 equals ten—as shown by three clusters 84(1)-84 (10).

Figure 6:
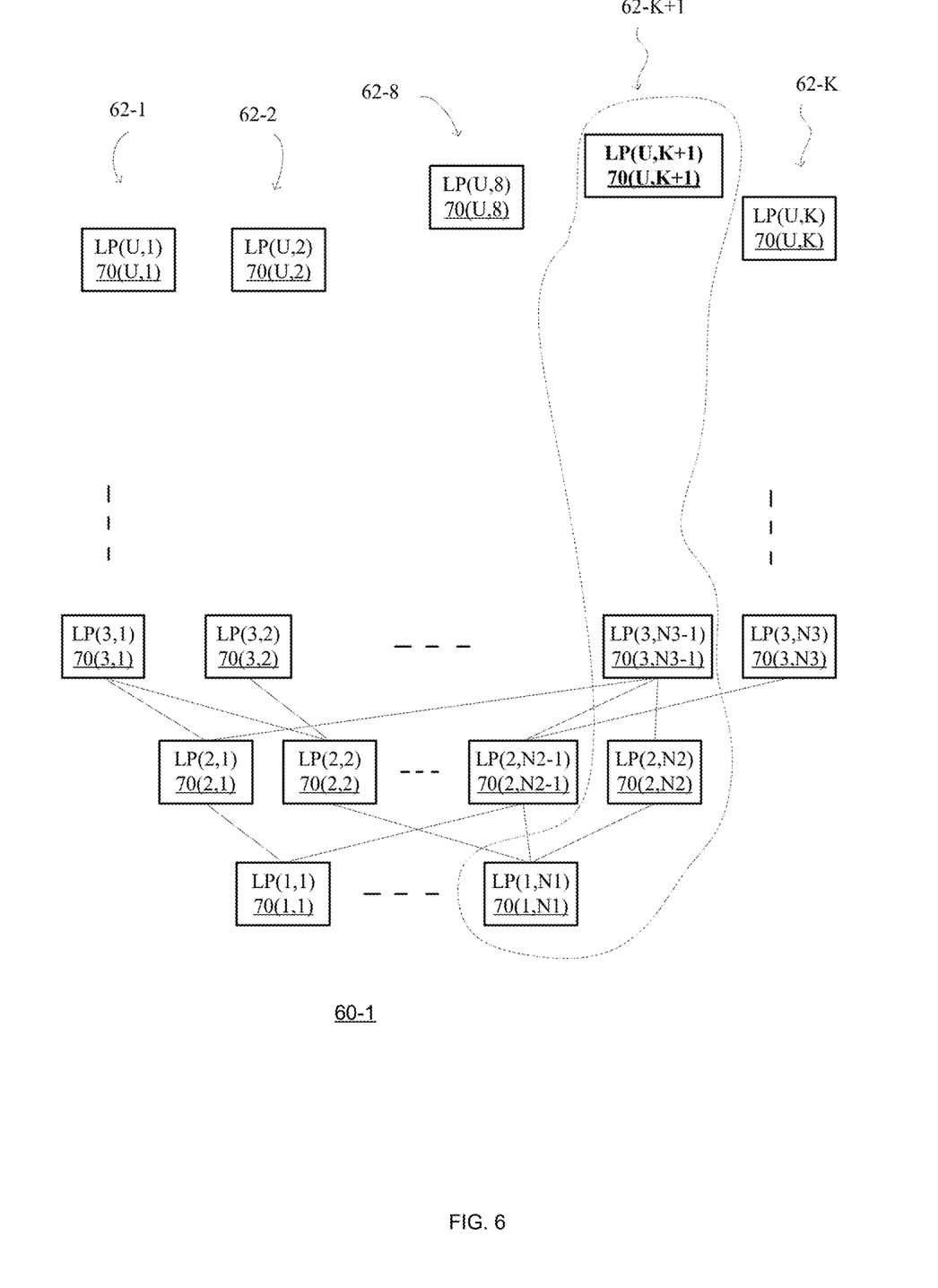
FIG. 6 illustrates an example of a group of neural networks following an addition of a new neural network.

FIG. 6 illustrates an amended group of neural networks 60-1 in which a new neural network (new in the sensed that the new neural network was added following a generation of the group of neural networks 60 of FIG. 3. The new neural network 62-L+1 includes a unique combination of layer portions and a unique layer portion LP(U,K+1) 70 (U,K+1).

FIG. 7 illustrates an example of method 200 for producing a group of neural networks. According to an embodiment, method 200 starts by initialization step 210.

According to an embodiment, initialization step 210 includes receiving or determining one or more input constraints such as size constraints or any other input constraints—at least some of which are illustrated above.

According to an embodiment, step 210 includes determining a number of layer portions per each layer based on an input constraint-such as but not limited to any of the input constraints mentioned above.

According to an embodiment, step 210 includes determining a connectivity between consecutive layer portions, such that determining a layer portion that is sharable by a neural network sub-group is based on the determined connectivity.

According to an embodiment, the determined connectivity is based on a partial connectivity between a layer portion of a specified neural network layer and layer portions of another neural network layer.

According to an embodiment, the determining of the connectivity is based on the connectivity of separately trained neural networks that are processed to generate the group of neural network. For example—assuming that a first layer portion is generated based on a set of first layers of separately trained neural networks-then the first layer portion will be connected to one or more second layer portions that are generated based on one or more sets of second layers of the separately trained neural networks that were connected to the first layers of the set of first layers.

Referring to cluster 78(1) of FIG. 4—it represents a set of first layers of the separately trained neural networks.

The set of first layers were connected to a set of second layers that are represented on a set of clusters of the second cluster map 80—for example in clusters 84(1), 84(5) and 84(9).

The set of clusters of the second cluster map (for example 84(1), 84(5) and 84(9)) are used to generate a set of three second layer portions of the group of neural networks—and a first layer portion associated with cluster 78(1) will be connected to the set of set of three second layer portions of the group of neural networks.

According to an embodiment, the determining of the connectivity is executed during or between any one of steps 220, 230 and 240.

According to an embodiment, step 210 is followed by step 220 of determining a first layer potion that is shared by a first neural network sub-group of the group. According to an embodiment there are multiple first layer portions.

According to an embodiment, step 220 is followed by step 230 of determining second layer portions that are sharable by second neural network sub-groups, such that different second layer portions are shared by different second neural network sub-groups of the group.

According to an embodiment, step 230 is followed by step 240 of determining third layer portions that are sharable by third neural network sub-groups, such that different third layer portions are shared by different third neural network sub-groups of the group.

According to an embodiment, step 240 is followed by step 250 of determining one or more additional layer portions that are sharable by one or more additional neural network sub-groups, such that different one or more additional layer portions are shared by different one or more additional neural network sub-groups of the group.

According to an embodiment, the determining of at least one of steps 220, 230, 240 and 250 includes clustering layers of the separately trained initial NNs, and determining a shared layer portion by merging layers of a cluster corresponding to the shared layer portion.

According to an embodiment, the determining of at least one of steps 220, 230, 240 and 250 includes is based on an outcome of multiple training and merging iterations.

According to an embodiment the merging includes averaging the weights and the biases of layers of a cluster. According to an embodiment the merging include applying a weighted sum or applying any function on the weights and the biases of layers of a cluster.

According to an embodiment, method 200 provides a group of neural networks in which each neural network of the group includes a unique combination of layer portions.

According to an embodiment, the unique combination of layer portions for each neural network defines a narrow driving-related task.

According to an embodiment, a series of layers from the first layer to the dedicated layer forms a neural network associated with a driving related task.

According to an embodiment, method 200 includes step 260 of updating the group of neural network. For example—step 260 includes adding a new neural network to the group.

According to an embodiment, the adding is based on a weight fit between weights of layers of the new neural network and weights of layer portions of the group of neural networks.

According to an embodiment, the adding involves re-training the new neural network according to the group of neural networks.

FIG. 8 illustrates an example of method 500 for using a group of neural networks in relation to driving related applications.

According to an embodiment, method 500 starts initialization step 510.

According to an embodiment, initialization step 510 includes obtaining a group of neural networks. The obtaining may include receiving by a vehicle the group of neural networks from a computerized system outside a vehicle, and/or loading the group of neural networks to a memory unit of a vehicle. The memory unit may be a cache memory and/or may be included in (or be) one or more memory/storage units. The obtaining may include requesting the group of neural networks from the remote computerized system.

According to an embodiment, the group of neural networks includes:
A. A first layer portion that is shared by a first neural network sub-group of the group. There may be multiple first layer portions.
B. Second layer portions that are sharable by second neural network sub-groups, such that different second layer portions are shared by different second neural network sub-groups of the group.
C. One or more additional layer portions that are sharable by one or more additional neural network sub-groups, such that different one or more additional layer portions are shared by different one or more additional neural network sub-groups of the group. The one or more additional layer portions include third layer portions that are sharable by third neural network sub-groups, such that different third layer portions are shared by different third neural network sub-groups of the group.

According to an embodiment, each neural network of the group includes a unique combination of layer portions.

According to an embodiment, the obtaining is based on one or more input constraints such as size constraints or any other input constraints—at least some of which are illustrated above. Additionally or alternatively, the obtaining is based on an expected path of the vehicle, weather conditions, availability of resources for executing and/or storing the group of neural networks, and the like.

According to an embodiment step 510 is followed by step 520 of applying the group of neural networks (or at least some of the neural networks of the group) on input information to generate at driving related decision and/or a classification decision or/or a lane detection decision, and the like.

According to an embodiment multiple iterations of steps 510 and 520 are executed—for example another group of neural networks may be obtained when the vehicle reaches a location that differs from a location in which the vehicle executed a previous iteration of step 520.

According to an embodiment, the group of neural network is a part of an ensemble of narrow AI agents-different AI agents are implemented by different neural networks of the group of neural networks. The group may be preceded by a perception router that sends perception information to relevant narrow AI agents.

According to an embodiment, the ensemble includes a large number (for example at least 50000) neural networks implemented by a group of neural networks.

According to an embodiment the relevant narrow AI agents (trained to execute a task associated with the received perception information and/or vehicle mission and/or vehicle route) are activated while at least some of the other narrow AI agents are not activated. The usage of shared network layer may require to activate at least parts of irrelevant neural networks (associated with irrelevant narrow AI agents).

An example of an ensemble of narrow AI agents is illustrated in U.S. patent application Ser. No. 18/036,150 which is incorporated herein by reference.

According to an embodiment, the ensemble used the group of neural networks illustrated above which reduces the resource consumption and facilitates the resources at a relatively accessible level to ensure prompt activation in low-latency scenarios.

According to an embodiment, the group of neural networks is in the form a branched tree, which consists of shared layers/representations between these networks, therefore it requires lower amount of memory than the naive structure of independent networks requires.

For example—assuming that should be 400000 neural networks, there is provided a group of neural networks that includes:
A. Instead of having 400000 first layers of 400000 different neural networks-a much smaller first number N1 (for example three) of first layer portions.
B. Instead of having 400000 second layers of 400000 different neural networks-a much smaller second number N2 (for example ten) of second layer portions.
C. Instead of having 400000 third layers of 400000 different neural networks-a much smaller third number N3 (for example one hundred) of third layer portions.

The group of neural networks allows to increase the number of neural networks by using logarithmic growing number of shared layer portions—and not exponential or multiplicative growing number of layers.

According to an embodiment, the group of neural networks is built during a generation process while taking into account shared representations across the different layers of the neural networks, using kernel/filter/weights that are similar to the shared representation.

According to an embodiment, the group of neural networks, even when assigning different neural networks to different skills or tasks, the group of neural networks may operate as a liquid neural network that may include neural networks that are selectively activated and deactivated.

According to an embodiment, the activation per layer portion (especially when selectively activating (only or mostly) relevant neural networks and decreases at the order of the layer increases—and/or when there are more layer portions per layer. For example—first layer portions are activated 50% of the rum time of the group, second layer are activated 10% of the run time, third layer portions are activated 1% of the run time, and the like.

According to an embodiment the generation of the group of networks may be based on multi-task training—as different neural networks of the group of neural networks are allocating to different task.

According to an embodiment the generation of the group of networks includes weight sharing—for example during a multi-task training. This not only improves the performance by leveraging the domain-specific information contained in the training signals of related tasks but also makes the model more parameter-efficient. According to an embodiment the weight sharing or merging may utilize weight sharing techniques such as the technique illustrated in "Multitask learning", Caruana, R., Machine learning volume 28, pages 41-75 (1997) which is incorporated herein by reference.

According to an embodiment, the group of neural networks is generated using a two stage approach: (a) Independently train M separate networks (M narrow agents), and (b) combining earlier stages of the networks-having shared representations for efficient runtimes. Could be done by looking for similar learned weights between parallel narrow networks.

According to an embodiment, the group of neural networks is generated using neural network distillation. An example of a neural network distillation is illustrated in "Distilling the Knowledge in a Neural Network" by Geoffrey Hinton, Oriol Vinyals, and Jeff Dean (2015): https://arxiv.org/abs/1503.02531, which is incorporated herein by reference.

According to an embodiment the group of neural networks is trained using an end-to-end approach that includes training the group of neural networks with a shared architecture from the start. The agents learn their respective narrow tasks while having the constraint of sharing weights for efficient learning.

According to an embodiment the group of neural networks is trained using a HyperNetwork approach that includes using a HyperNetwork which is conditioned on the scenario, to predict the scenario-specific weights. In this case, some of the layers are fixed and shared between all agents, while a separate HyperNetwork predicts the scenario-specific weights . . .

According to an embodiment early network layers portions capture lower-level information and are more likely to be shared across (more) different agents.

According to an embodiment, the selection of which layer portions to share post-training, as mentioned above by network distillation, and also by methods of information similarity between different networks-see for example each one of the following articles which are incorporated herein by reference:
A. "Towards Understanding Learning Representations: To What Extent Do Different Neural Networks Learn the Same Representation" by Maximillian Schmidt, Marvin Giese, and Eric J. Wederman (2018).

B. "Similarity of Neural Network Representations Revisited" by Romain Lopez-Roig, Janis Lizarraguirre-Rodriguez, and Armand Joubert (2019): https://arxiv.org/pdf/2305.06329

According to an embodiment, when there is provide an ensemble of agents—the HyperNetworks method described above is used in conjunction with a routing mechanism According to an embodiment the sharing of layer portions is made across narrow scenario and not on a functional unit basis.

According to an embodiment, the suggested of the group of neural networks and/or generation of the of the group of neural networks is agnostic to the training of the initially trained neural networks as the initially trained neural networks can be trained separately; autonomously and independently; or alternatively can be a cross-network training.

Any combination of any step of any method illustrated in the application is provided.

In the foregoing detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarding the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any one of transformation module, active learning module, or clustering module, or any other module described herein, may be implemented in hardware and/or code, instructions and/or commands stored in a non-transitory computer readable medium, may be included in a vehicle, outside a vehicle, in a mobile device, in a server, and the like.

The vehicle may be any type of vehicle-such as a ground transportation vehicle, an airborne vehicle, or a water vessel.

The specification and/or drawings may refer to an image. An image is an example of sensed information. Any reference to an image may be applied mutatis mutandis to any type of natural signal such as but not limited to signal generated by nature, signal representing human behavior, signal representing operations related to the stock market, a medical signal, financial series, geodetic signals, geophysical, chemical, molecular, textual and numerical signals, time series, and the like. Any reference to a media unit may be applied mutatis mutandis to sensed information. The sensed information may be of any kind and may be sensed by any type of sensors-such as a visual light camera, an audio sensor, a sensor that may sense infrared, radar imagery, ultrasound, electro-optics, radiography, LIDAR (light detection and ranging), etc. The sensing may include generating samples (for example, pixel, audio signals) that represent the signal that was transmitted, or otherwise reach the sensor.

The specification and/or drawings may refer to a concept structure. A concept structure may include one or more clusters. Each cluster may include signatures and related metadata. Each reference to one or more clusters may be applicable to a reference to a concept structure.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Any reference to an object may be applicable to a pattern. Accordingly-any reference to object detection is applicable mutatis mutandis to a pattern detection.

A situation may be a singular location/combination of properties at a point in time. A scenario is a series of events that follow logically within a causal frame of reference. Any reference to a scenario should be applied mutatis mutandis to a situation.

The sensed information unit may be sensed by one or more sensors of one or more types. The one or more sensors may belong to the same device or system—or may belong to different devices of systems.

What is claimed is:
1. A group of neural networks, comprising:
   first neural networks of first neural network sub-groups, wherein different first neural network sub-groups share different first layer portions of a first layer of the group; wherein weights and biases of the different first layer portions are determined by merging weights and biases of first layers of initially and separately trained neural networks that are represented by first layer representations that are clustered to different first clusters;

second neural networks of second neural network sub-groups, wherein different second neural network sub-groups share different second layer portions of a second layer of the group; wherein weights and biases of the different second layer portions are determined by merging weights and biases of second layers of the initially and separately trained neural networks that are represented by second layer representations that are clustered to different second clusters; and third neural networks of third neural network sub-groups, wherein different third neural network sub-groups share different third layer portions of a third layer of the group; wherein weights and biases of the different third layer portions are determined by merging weights and biases of third layers of the initially and separately trained neural networks that are represented by third layer representations that are clustered to different third clusters;

wherein each neural network of the first neural networks, the second neural networks and the third neural networks comprises a unique combination of layer portions that is different from other neural networks of the group;

wherein the first layer of the group is followed by the second layer of the group, and the second layer of the group is followed by the third layer of the group;

wherein for each neural network of the initially and separately trained neural networks, a first layer of the neural network is followed by the second layer of the neural network, and the second layer of the neural network is followed by the third layer of the network.

2. The group of neural networks according to claim 1, wherein each neural network of the group comprises at least one dedicated layer portion that is not shared by another neural network of the group.

3. The group of neural networks according to claim 1, wherein the unique combination of layer portions is forming a neural network associated with a different driving related task.

4. The group of neural networks according to claim 1, wherein a number of layer portions is determined per each layer of layers of the group based on a number of layers of the group and on a size of a memory space required to store the group.

5. The group of neural networks according to claim 1, wherein a number of layer portions is determined per each layer of layers of the group based on a type of activation function associated with the neural networks of the group.

6. The group of neural networks according to claim 1, wherein at least one neural network is added to the group after formation of at least one of the first neural network sub-group, the second neural network sub-group or the third neural network sub-group.

7. A method of producing a group of neural networks, the method comprising:

determining first neural networks of first neural network sub-groups, wherein different first neural network sub-groups share different first layer portions of a first layer of the group; wherein weights and biases of the different first layer portions are determined by merging weights and biases of first layers of initially and separately trained neural networks that are represented by first layer representations that are clustered to different first clusters;

determining second neural networks of second neural network sub-groups, wherein different second neural network sub-groups share different second layer portions of a second layer of the group; wherein weights and biases of the different second layer portions are determined by merging weights and biases of second layers of the initially and separately trained neural networks that are represented by second layer representations that are clustered to different second clusters; and determining third neural networks of third neural network sub-groups, wherein different third neural network sub-groups share different third layer portions of a third layer of the group; wherein weights and biases of the different third layer portions are determined by merging weights and biases of third layers of the initially and separately trained neural networks that are represented by third layer representations that are clustered to different third clusters; and wherein each neural network of the first neural networks, the second neural networks and the third neural networks comprises a unique combination of layer portions that is different from other neural networks of the group;

wherein the first layer of the group is followed by the second layer of the group, and the second layer of the group is followed by the third layer of the group;

wherein for each neural network of the initially and separately trained neural networks, a first layer of the neural network is followed by the second layer of the neural network, and the second layer of the neural network is followed by the third layer of the network.

8. The method of claim 7, further comprising determining a connectivity between consecutive layer portions, such that determining a layer portion that is sharable by a neural network sub-group is based on the determined connectivity.

9. The method of claim 8, wherein the determined connectivity is based on a partial connectivity between a layer portion of a specified neural network layer and layer portions of another neural network layer.

10. The method of claim 7, further comprising determining a number of layer portions per each layer based on an input constraint.

11. The method according to claim 7, wherein the unique combination of layer portions for each neural network defines a narrow driving-related task.

12. The method according to claim 7, where a series of layers from the first layer to the dedicated layer forms a neural network associated with a driving related task.

13. The method according to claim 7, further comprising adding a new neural network to the group.

14. The method according to claim 13, wherein the adding is based on a weight fit between weights of layers of the new neural network and weights of layer portions of the group of neural networks.

15. The group of neural networks according to claim 13, wherein the adding involves re-training the new neural network according to the group of neural networks.

16. The method according to claim 7, wherein the determining of layer portions of the group of NNs is based on an outcome of multiple training and merging iterations.

17. A non-transitory computer readable medium for producing a group of neural networks, non-transitory computer readable medium that stores instructions executable by a processor to:

determine first neural networks of first neural network sub-groups, wherein different first neural network sub-groups share different first layer portions of a first layer of the group; wherein weights and biases of the different first layer portions are determined by merging weights and biases of first layers of initially and separately trained neural networks that are represented by first layer representations that are clustered to different first clusters;

determine second neural networks of second neural network sub-groups, wherein different second neural network sub-groups share different second layer portions of a second layer of the group; wherein weights and biases of the different second layer portions are determined by merging weights and biases of second layers of the initially and separately trained neural networks that are represented by second layer representations that are clustered to different second clusters; and determine third neural networks of third neural network sub-groups, wherein different third neural network sub-groups share different third layer portions of a third layer of the group; wherein weights and biases of the different third layer portions are determined by merging weights and biases of third layers of the initially and separately trained neural networks that are represented by third layer representations that are clustered to different third clusters;

and wherein each neural network of the first neural networks, the second neural networks and the third neural networks comprises a unique combination of layer portions that is different from other neural networks of the group;

wherein the first layer of the group is followed by the second layer of the group, and the second layer of the group is followed by the third layer of the group;

wherein for each neural network of the initially and separately trained neural networks, a first layer of the neural network is followed by the second layer of the neural network, and the second layer of the neural network is followed by the third layer of the network.

\* \* \* \* \*